(12) United States Patent
Matsunaga et al.

(10) Patent No.: US 9,879,617 B2
(45) Date of Patent: Jan. 30, 2018

(54) CONTROL APPARATUS OF ENGINE

(71) Applicant: MITSUBISHI JIDOSHA KOGYO KABUSHIKI KAISHA, Tokyo (JP)

(72) Inventors: Ayatoshi Matsunaga, Aichi (JP); Yasuo Yamaguchi, Aichi (JP); Shinichi Murata, Aichi (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 213 days.

(21) Appl. No.: 14/980,417

(22) Filed: Dec. 28, 2015

(65) Prior Publication Data

US 2016/0108827 A1 Apr. 21, 2016

Related U.S. Application Data

(63) Continuation of application No. PCT/JP2014/065709, filed on Jun. 13, 2014.

(30) Foreign Application Priority Data

Jun. 27, 2013 (JP) ................................. 2013-135555

(51) Int. Cl.
*F02B 37/18* (2006.01)
*F02D 23/02* (2006.01)
(Continued)

(52) U.S. Cl.
CPC .............. *F02D 23/02* (2013.01); *F02B 33/40* (2013.01); *F02B 37/18* (2013.01); *F02B 37/183* (2013.01);
(Continued)

(58) Field of Classification Search
CPC ...... F02B 37/18; F02B 37/183; F02B 37/186; F02D 41/0007; F02D 41/3094; F02D 2041/389
See application file for complete search history.

(56) References Cited

U.S. PATENT DOCUMENTS 4,452,044 A 6/1984 Iwamoto et al.

FOREIGN PATENT DOCUMENTS

JP 61-265331 A 11/1986
JP 4-54222 A 2/1992
(Continued)

OTHER PUBLICATIONS

Extended European Search Report dated Mar. 14, 2017 in corresponding European Patent Application No. 14816669.7.

*Primary Examiner* — Jonathan Matthias
(74) *Attorney, Agent, or Firm* — Birch, Stewart, Kolasch & Birch, LLP

(57) ABSTRACT

A control apparatus of an engine comprises: fuel injection control device that controlling injection amounts of fuel injected from a first fuel injection valve, which injects fuel into an intake path of the engine, and a second fuel injection valve, which injects fuel into a combustion chamber of the engine, in accordance with the operating state of the engine; and valve control device that changes the open/closed state of the waste gate valve in accordance with the injection amounts of fuel injected from the first fuel injection valve and the second fuel injection valve. The fuel injection control device increases the injection amount of fuel injected from the second fuel injection valve in accordance with an increase in the load or speed of the engine. The valve control device changes the open/closed state of the waste gate valve in the sequence of an opening direction, a closing direction, and an opening direction as the injection amount of fuel injected from the second fuel injection valve increases.

10 Claims, 5 Drawing Sheets

(51) Int. Cl.
    *F02D 41/30*          (2006.01)
    *F02D 41/00*          (2006.01)
    *F02B 33/40*          (2006.01)
    *F02M 26/01*         (2016.01)

(52) U.S. Cl.
    CPC ..... *F02D 41/0007* (2013.01); *F02D 41/3005* (2013.01); *F02D 41/3094* (2013.01); F02D 2250/11 (2013.01); F02M 26/01 (2016.02); Y02T 10/144 (2013.01)

(56) References Cited

FOREIGN PATENT DOCUMENTS

| | | |
|---|---|---|
| JP | 2003-83138 A | 3/2003 |
| JP | 2005-214063 A | 8/2005 |
| JP | 2012-163026 A | 8/2012 |
| JP | 2012-167607 A | 9/2012 |
| WO | WO 2006/095515 A1 | 9/2006 |

CONTROL APPARATUS OF ENGINE

This application is a Continuation of PCT International Application No. PCT/JP2014/065709, filed on Jun. 13, 2014, which claims priority under 35 U.S.C. 119(a) to Patent Application No. 2013-135555, filed in Japan on Jun. 27, 2013, all of which are hereby expressly incorporated by reference into the present application.

TECHNICAL FIELD

This invention relates to a control apparatus of an engine equipped with a waste gate valve for adjusting a boost pressure by a turbocharger.

BACKGROUND ART

So far, an engine equipped with a supercharger such as a turbocharger has been provided with an exhaust bypass passage for bypassing a turbine of the supercharger, and the exhaust bypass passage has been provided with a waste gate valve for opening and closing the exhaust bypass passage. Upon opening/closing of the waste gate valve, an excessive rise in a boost pressure is suppressed, whereby stability of the boost pressure is ensured, and damage to the engine or the supercharger itself is inhibited.

In recent years, moreover, it has been common practice to actively control the opening/closing action of the waste gate valve in accordance with the operating state of the engine. There has been, for example, a supercharger-equipped engine having a first fuel injection valve for injecting fuel to an intake path (intake port) (i.e., port injection valve), and a second fuel injection valve for injecting fuel into a combustion chamber (i.e., cylinder injection valve), wherein in accordance with the operating state of the engine, the cylinder injection valve and the port injection valve are controlled, and a waste gate valve (exhaust bypass valve) is also opened and closed as appropriate (see, for example, Patent Document 1).

This Patent Document 1 discloses a technology which opens the exhaust bypass valve together with an intake bypass valve, for example, when shifting from a homogeneous lean operation concurrently using supercharging to stratified combustion involving no supercharging.

PRIOR ART DOCUMENTS

Patent Documents
Patent Document 1: JP-A-2005-214063

SUMMARY OF THE INVENTION

Problems to be Solved by the Invention

Assume that in a situation where the operating state of the engine is, for example, in a low load operating range with a small flow rate of air, fuel is directly injected from the second fuel injection valve into the combustion chamber. In this case, fuel and intake air are mixed insufficiently. Thus, combustion efficiency decreases, with the result that fuel economy may deteriorate or an exhaust gas may be adversely affected. Moreover, fuel deposits on the top surface of the piston and the inner wall of the cylinder, thus potentially posing problems such as dilution of an engine oil (oil dilution) or formation of carbon.

With the above-mentioned supercharger-equipped engine having the first fuel injection valve (port injection valve) and the second fuel injection valve (cylinder injection valve), therefore, it is attempted to improve combustion stability or the like by changing the injection amounts or the injection ratios of the first and second fuel injection valves in accordance with the operating state of the engine.

The combustion stability or the like of the engine can be improved by changing, as appropriate, the injection amounts or the injection ratios of the first and second fuel injection valves in accordance with the operating state of the engine. However, the improvement is not sufficient, and a further improvement is desired.

The present invention has been accomplished in the light of the above circumstances. It is an object of the invention to provide a control apparatus of an engine which can enhance combustion stability and also improve fuel economy.

Means for Solving the Problems

A first aspect of the present invention, for solving the above problems, is a control apparatus of an engine having a first fuel injection valve for injecting fuel into an intake path of the engine, a second fuel injection valve for injecting fuel into a combustion chamber of the engine, a supercharger for supercharging intake air for the engine, and a waste gate valve for opening and closing an exhaust bypass passage for bypassing a turbine of the supercharger, the control apparatus comprising: fuel injection control device that controls injection amounts of fuel injected from the first fuel injection valve and the second fuel injection valve in accordance with an operating state of the engine; and valve control device that changes an open/closed state of the waste gate valve in accordance with the injection amounts of fuel injected from the first fuel injection valve and the second fuel injection valve, wherein the fuel injection control device increases the injection amount of fuel injected from the second fuel injection valve in accordance with an increase in a load or speed of the engine, and the valve control device changes the open/closed state of the waste gate valve in a sequence of an opening direction, a closing direction, and an opening direction as the injection amount of fuel injected from the second fuel injection valve increases.

A second aspect of the present invention is the control apparatus of an engine according to the first aspect, wherein the fuel injection control device changes injection ratios of fuel injected from the first fuel injection valve and the second fuel injection valve in accordance with an operating range of the engine, and the valve control device sets the waste gate valve in the open state in a first operating range in which the injection amount of the first fuel injection valve is large.

A third aspect of the present invention is the control apparatus of an engine according to the second aspect, wherein the valve control device sets the waste gate valve in the closed state in a second operating range in which the injection amount of the second fuel injection valve is large, and sets the waste gate valve in the open state at a predetermined timing conformed to an increase in the injection ratio or injection amount of the second fuel injection valve in the second operating range.

A fourth aspect of the present invention is the control apparatus of an engine according to the second or third aspect, wherein the fuel injection control device allows fuel to be injected only from the first fuel injection valve in the first operating range, and the valve control device brings the waste gate valve into the closed state, at a time when the fuel injection control device allows fuel to be injected from the second fuel injection valve.

A fifth aspect of the present invention is the control apparatus of an engine according to any one of the first to fourth aspects, wherein the fuel injection control device gradually increases an injection ratio or the injection amount of the second fuel injection valve as the load or speed of the engine increases.

Effects of the Invention

With the present invention, the waste gate valve is changed in the sequence of the opening direction, the closing direction, and the opening direction in accordance with a change in the operating state of the engine (an increase in the load or speed of the engine). Thus, the amount of intake air is appropriately adjusted in accordance with the operating state of the engine. Hence, the flow inside the cylinder is optimized, whereby combustion stability can be enhanced. Also, the occurrence of knocking can be suppressed, and fuel economy can be improved.

MODE FOR CARRYING OUT THE INVENTION

An embodiment of the present invention will now be described in detail by reference to the accompanying drawings.

Figure 1:
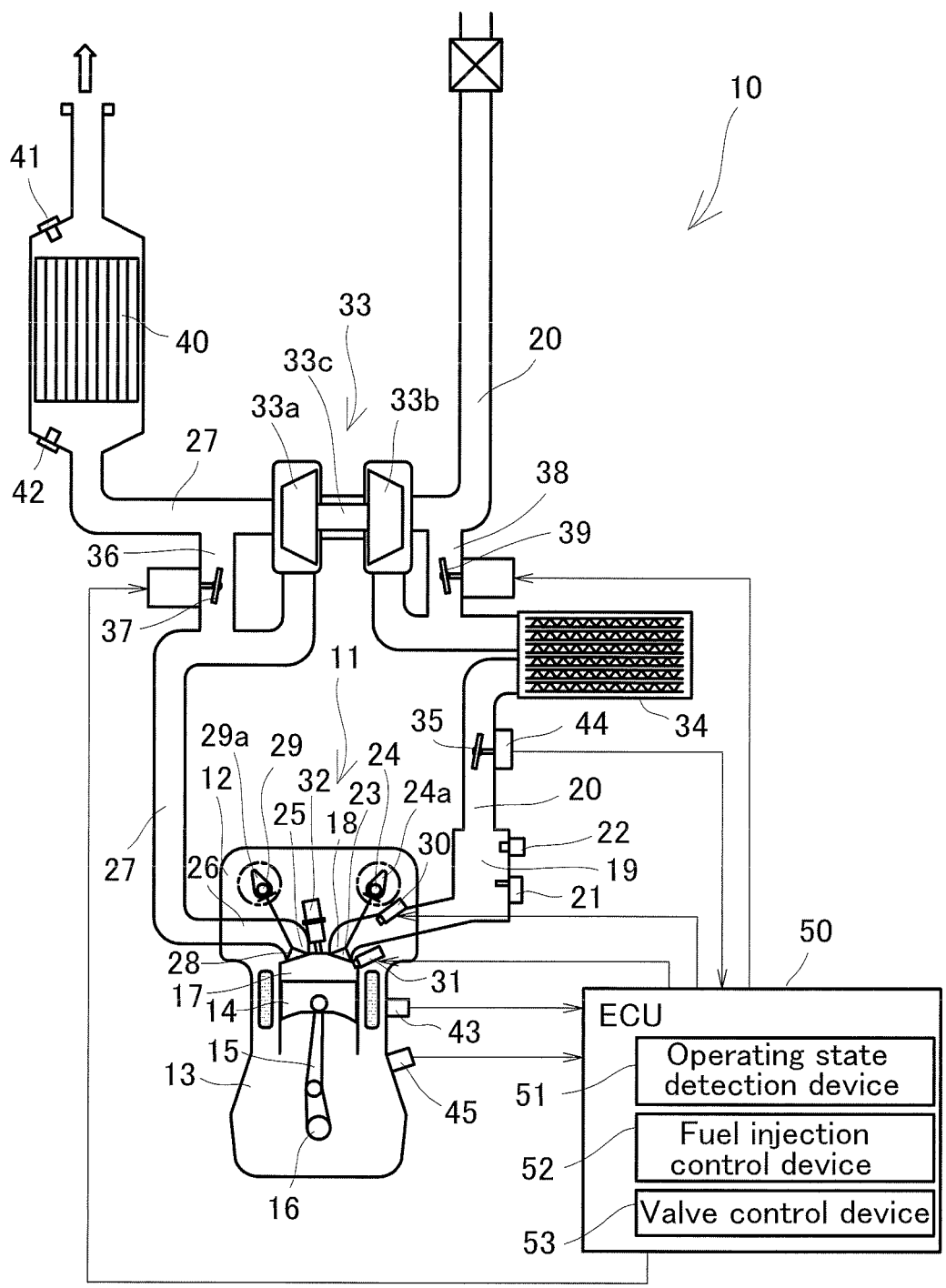
FIG. 1 is a schematic view of an engine equipped with a control apparatus according to an embodiment of the present invention.

First of all, an explanation will be offered for the entire configuration of an engine 10 according to the embodiment of the present invention. As shown in FIG. 1, an engine body 11 constituting the engine 10 has a cylinder head 12 and a cylinder block 13, and a piston 14 is accommodated within the cylinder block 13. The piston 14 is connected to a crankshaft 16 via a connecting rod 15. The piston 14, the cylinder head 12, and the cylinder block 13 form a combustion chamber 17.

An intake port 18 is formed in the cylinder head 12, and an intake pipe (intake path) 20 including an intake manifold 19 is connected to the intake port 18. The intake pipe 20 is provided with an intake pressure sensor (MAP sensor) 21 for detecting an intake pressure, and an intake temperature sensor 22 for detecting the temperature of intake air. An intake valve 23 is also provided inside the intake port 18, and the intake port 18 is opened and closed with the intake valve 23. That is, the intake valve 23 is configured to act following an intake cam 24a of an intake camshaft 24 rotating in accordance with the engine rotation, thereby allowing the combustion chamber 17 and the intake port 18 to communicate with or be shut off from each other. Further, an exhaust port 25 is formed in the cylinder head 12, and an exhaust pipe (exhaust path) 27 including an exhaust manifold 26 is connected to the interior of the exhaust port 25. An exhaust valve 28 is provided in the exhaust port 25, and the exhaust valve 28, like the intake valve 23 in the intake port 18, is configured to act following an exhaust cam 29a of an exhaust camshaft 29, thereby allowing the combustion chamber 17 and the exhaust port 25 to communicate with or be shut off from each other.

Moreover, the engine body 11 is provided with a first fuel injection valve (intake path injection valve) 30 for injecting fuel into the intake pipe (intake path) 20, for example, near the intake port 18, and is also provided with a second fuel injection valve (cylinder injection valve) 31 for directly injecting fuel into the combustion chamber 17 of each cylinder. The first fuel injection valve 30 is supplied with fuel from a low pressure supply pump installed within a fuel tank (not shown) via a low pressure delivery pipe, while the second fuel injection valve 31 is supplied with fuel from a high pressure supply pump, which further pressurizes the fuel supplied from the low pressure supply pump, via a high pressure delivery pipe, although these configurations are not shown. The high pressure delivery pipe is supplied with fuel, which has been supplied from the low pressure supply pump, while being pressurized to a predetermined pressure by the high pressure supply pump. The cylinder head 12 is further mounted with a spark plug 32 for each cylinder.

A turbocharger 33, which is a supercharger, is provided halfway between the intake pipe 20 and the exhaust pipe 27. The turbocharger 33 has a turbine 33a and a compressor 33b, and the turbine 33a and the compressor 33b are coupled together by a turbine shaft 33c. When an exhaust gas flows into the turbocharger 33, the turbine 33a is rotated by the flow of the exhaust gas and, in accordance with the rotation of the turbine 33a, the compressor 33b is rotated. Air (intake air) pressurized by the rotations of the compressor 33b is sent out into the intake pipe 20, and supplied to each intake port 18. The turbocharger 33 is relatively small in size.

An intercooler 34 is provided at a portion of the intake pipe 20 downstream of the compressor 33b, and a throttle valve 35 is provided downstream of the intercooler 34. An upstream side and a downstream side of the exhaust pipe 27, with the turbocharger 33 being interposed therebetween, are connected together by an exhaust bypass passage 36. That is, the exhaust bypass passage 36 is a passage for bypassing the turbine 33a of the turbocharger 33. A waste gate valve (WGV) 37 is provided in the exhaust bypass passage 36. The waste gate valve 37 is equipped with a valve body, and an electrically operated actuator for driving the valve body, and the amount of the exhaust gas flowing through the exhaust bypass passage 36 can be adjusted depending on the opening of the valve body. That is, the waste gate valve 37 is configured to be capable of adjusting the boost pressure of the turbocharger 33 by having the opening of the valve body adjusted.

An upstream side and a downstream side of the intake pipe 20, with the turbocharger 33 being interposed therebetween, are connected together by an intake bypass passage 38. That is, the intake bypass passage 38 is a passage for bypassing the compressor 33b of the turbocharger 33. An intake bypass valve 39 for opening and closing the intake bypass passage 38 is provided in the intake bypass passage 38. The configuration of the intake bypass valve 39 is not limited, but in the present embodiment, the intake bypass valve 39 is equipped with a valve body and an actuator, as is the waste gate valve 37.

A three-way catalyst 40, an exhaust gas purification catalyst, is interposed in a portion of the exhaust pipe 27 on the downstream side of the turbocharger 33. An $O_2$ sensor 41 for detecting the $O_2$ concentration of the exhaust gas after passage through the catalyst is provided on the outlet side of the three-way catalyst 40. A linear air-fuel ratio sensor (LAFS) 42 for detecting the air-fuel ratio of the exhaust gas (exhaust air-fuel ratio) before passage through the catalyst is provided on the inlet side of the three-way catalyst 40.

The engine 10 is also equipped with an electronic control unit (ECU) 50, and the ECU 50 is equipped with input/output devices, storage devices for storage of control programs and control maps, a central processing unit, and timers and counters. The ECU 50 exercises the integrated control of the engine 10 based on information from the various sensors. The control apparatus of an engine according to the present embodiment is composed of such an ECU 50, and appropriately controls the opening/closing action of the waste gate valve 37 as will be described below.

The following is an explanation for control over the opening/closing action of the waste gate valve by the control apparatus of an engine according to the present embodiment.

The ECU 50 is equipped with an operating state detection device 51, a fuel injection control device 52, and a valve control device 53. The operating state detection device 51 detects the operating state of the engine 10, for example, based on information from the various sensors such as a throttle position sensor 44 and a crank angle sensor 45.

Figure 2:
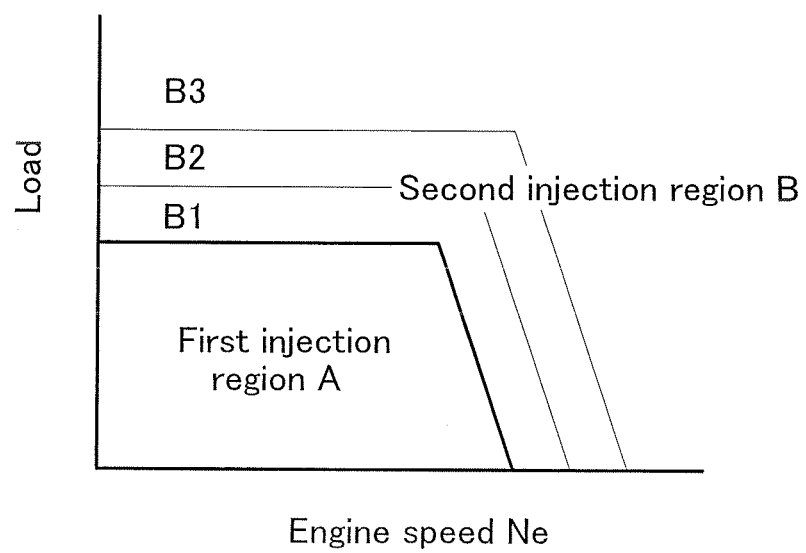
FIG. 2 is an example of a map specifying fuel injection control according to the embodiment of the present invention.

The fuel injection control device 52 controls, as appropriate, the injection amounts of fuel injected from the first fuel injection valve 30 and the second fuel injection valve 31 in accordance with the operating state of the engine 10, namely, in accordance with the detection results of the operating state detection device 51. In the present embodiment, the fuel injection control device 52 controls, as appropriate, the injection amounts of fuel injected from the first fuel injection valve 30 and the second fuel injection valve 31, and also changes, as appropriate, the injection ratios of fuel injected from the first fuel injection valve 30 and the second fuel injection valve 31. Concretely, the fuel injection control device 52 refers to an operating range map as shown in FIG. 2, and determines the injection amounts or injection ratios of the first fuel injection valve 30 and the second fuel injection valve 31, depending on which of the injection regions (operating ranges) the current operating state of the engine 10 is in.

In the present embodiment, the fuel injection control device 52 exercises control for injecting fuel only from the first fuel injection valve 30 (hereinafter referred to as "MPI injection control"), and control for injecting fuel from each of the first fuel injection valve 30 and the second fuel injection valve 31 at a predetermined injection ratio (hereinafter referred to as "MPI+DI injection control"), in accordance with the operating state of the engine 10. As shown in FIG. 2, for example, the operating ranges of the engine 10 are set based on the speed Ne and load of the engine 10. In the present embodiment, two regions are set, a first injection region A which is the operating range on a low rotation, low load side, and a second injection region B which is the operating range on a high rotation, high load side. The fuel injection control device 52 performs "MPI injection control" if the operating state of the engine 10 is in the first injection region A, but performs "MPI+DI injection control" if the operating state of the engine 10 is in the second injection region B.

A first reason why MPI injection control is performed in the first injection region A is, first of all, that an intake pumping loss is cut down. Direct injection of fuel into the cylinder (i.e., DI injection) increases the volumetric efficiency because of an intake air cooling effect, so that under low load, the intake amount needs to be further reduced using the throttle valve, thereby leading to an increase in the intake pumping loss. With port injection (MPI injection), on the other hand, the intake air cooling effect is so low that there is no increase in the intake pumping loss.

Secondly, combustion stability should be kept satisfactory. In an extremely low load region included in the first injection region A, the amount of air taken in by the engine 10 is so small that the actual compression ratio is low and combustion minimally stabilizes. In such a region, internal EGR is added to raise the temperature of the air-fuel mixture before ignition, whereby combustion stability and pumping loss reduction can both be ensured. Direct injection of fuel into the cylinder (DI injection), however, lowers the combustion stability because of the intake air cooling effect. Port injection (MPI injection), on the other hand, can keep combustion stability satisfactory, without lowering the temperature of the air-fuel mixture.

In the first injection region A, the waste gate valve 37 is in the open state, as will be described later. Thus, exhaust resistance is low, and internal EGR due to the exhaust resistance minimally occurs. However, the waste gate valve 37 is in the open state, the amount of the exhaust gas is small, and the turbine 33a does not rotate. Thus, the boost pressure does not work, with the result that the pressure within the intake pipe 20 is a negative pressure in the first injection region A. The interior of the exhaust pipe 27, on the other hand, is at an atmospheric pressure or a positive pressure. If a valve overlap amount is increased, therefore, the exhaust gas flows reversely from the exhaust pipe 27 at the positive pressure toward the intake pipe 20 at the negative pressure through the interior of the cylinder. That is, control using the valve overlap amount can result in the control of the amount of the internal EGR.

A third reason for executing MPI injection control in the first injection region A is that the amount of discharge of unburned fuel components is decreased. In the first injection region A, the low load region, the amount of intake air is small, and thus the flow inside the cylinder is also small, so that the formation of an air-fuel mixture by direct injection (DI injection) tends to be insufficient, and the discharge of unburned fuel components increases. With port injection (MPI injection), on the other hand, exhaust spit-back into the intake pipe 20 at the time of opening the intake valve 23, or passage through the narrow clearance of the valve during intake is enough to promote mixing or evaporation, thus enabling the unburned fuel to be decreased.

In the fourth place, the efficiency of the engine 10 should be increased. Direct injection (DI injection) requires a high fuel pressure, thus taking the work of driving the fuel pump. Thus, an increase in the amount of fuel supplied by direct injection increases the fuel pump driving work. With port injection (MPI injection), on the other hand, this work is unnecessary, and thus the efficiency of the engine 10 can be raised.

Returning to FIG. 2, a plurality of regions (e.g., B1 to B3) are set, starting from the low rotation, low load side, within the second injection region B. The fuel injection control device 52 appropriately controls the first fuel injection valve 30 and the second fuel injection valve 31 in such a manner that the higher rotation, higher load injection region the operating state of the engine 10 resides in, the higher the injection amount or the injection ratio of the second fuel injection valve 31 becomes. That is, in the example of the map shown in FIG. 2, when the operating state of the engine 10 is in the region B3, the fuel injection control device 52 controls, as appropriate, the first fuel injection valve 30 and the second fuel injection valve 31 such that the injection amount or the injection ratio of the second fuel injection valve 31 is the highest. In the present embodiment, the injection amounts or the injection ratios of the first fuel injection valve 30 and the second fuel injection valve 31 in each of the regions B1, B2 and B3 of the second injection region B are constant, but in each of the regions B1, B2 and B3, the injection amount or the injection ratio of the second fuel injection valve 31 may be rendered greater on the higher rotation, higher load side.

The valve control device 53 controls the opening/closing action of the waste gate valve 37 provided in the exhaust bypass passage 36, in accordance with the injection amounts from the first fuel injection valve 30 and the second fuel injection valve 31. In the present embodiment, the valve controls device 53 controls the open/closed state of the waste gate valve 37 as the injection amount or injection ratio of the second fuel injection valve 31 increases. Concretely, the valve controls device 53 changes the open/closed state of the waste gate valve 37 in the sequence of an opening direction, a closing direction, and an opening direction, with the increase in the injection amount or injection ratio of the second fuel injection valve 31.

If the injection amount or injection ratio of the first fuel injection valve 30 is higher than that of the second fuel injection valve 31, for example, the valve control device 53 brings the waste gate valve 37 into an open state (controls it to act in the opening direction). If the injection amount or injection ratio of the second fuel injection valve 31 is higher than that of the first fuel injection valve 30, on the other hand, the valve control device 53 brings the waste gate valve 37 into a closed state (controls it to act in the closing direction), and also places the waste gate valve 37 in the open state (controls it to act in the opening direction) at a predetermined timing conformed to an increase in the injection amount or injection ratio from the second fuel injection valve 31 within the same region. By adjusting the open/closed state (opening) of the waste gate valve 37 in this manner, the boost pressure by the turbocharger 33 is appropriately controlled.

It is to be noted that the "open state" does not necessarily mean that the waste gate valve 37 is only in a fully open state, but the waste gate valve 37 may be in a slightly closed state. In other words, the "open state" refers to a state where the opening (opening valve height) of the waste gate valve 37 is relatively great, for example, a state where its opening is in an opening range of 50% or more relative to the opening corresponding to full openness. The full openness represents the maximum value in the set range of the openings of the waste gate valve 37. Assume, for example, that if the opening is expressed as the opening valve height, the waste gate valve 37 can be used physically at an opening valve height of 0 to 10 mm. Even in this case, if the opening valve height in actual use is 0 to 8 mm, the full openness represents the position at 8 mm. Similarly, the "closed state" does not necessarily mean only a fully closed state, and a slightly open state is permissible.

Figure 3:
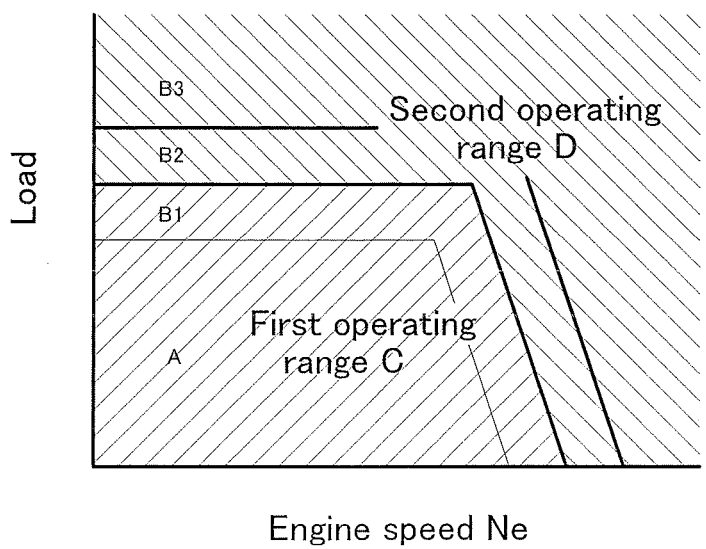
FIG. 3 is a view showing an exemplary map specifying opening/closing control over a waste gate valve according to the embodiment of the present invention.

As mentioned above, the injection amounts or injection ratios of the first fuel injection valve 30 and the second fuel injection valve 31 are determined based on the operating range map (see FIG. 2). Similarly, the open/closed state of the waste gate valve 37 is also determined based on the predetermined operating range map (see FIG. 3). The operating range map for determining the opening/closing action of the waste gate valve 37 is set based on the operating range map for determining the injection amount or injection ratio (FIG. 2) and, as FIG. 3 shows an example, two ranges are set, a first operating range C on a low rotation, low load side, and a second operating range D on a high rotation, high load side.

The first operating range C is an operating range in which the injection amount or injection ratio of the first fuel injection valve 30 is high and, in the present embodiment, includes the aforementioned first injection region A and a part of the above second injection region B (e.g., region B1). The second operating range D is an operating range in which the injection amount or injection ratio of the first fuel injection valve 30 is low (the injection ratio of the second fuel injection valve 31 is high) and, in the present embodiment, includes a part of the second injection region B (regions B2, B3).

The valve control device 53 refers to such an operating range map (FIG. 3) and, when determining from the detection results of the operating state detection device 51 that the operating state of the engine 10 is in the first operating range C, namely, in the first injection region A or region B1, places the waste gate valve 37 in the open state. When determining that the operating state of the engine 10 is in the region B2 included in the second operating range D, the valve control device 53 sets the waste gate valve 37 in the closed state. Further, when determining that the operating state of the engine 10 is in the region B3 included in the second operating range D, the valve control device 53 sets the waste gate valve 37 in the open state.

As described above, the open/closed state of the waste gate valve 37 is changed in the sequence of the opening direction, the closing direction, and the opening direction in accordance with the injection ratios of the first fuel injection valve 30 and the second fuel injection valve 31. By so doing, intake air and fuel can be mixed well, combustion stability can be enhanced, the occurrence of knocking can be suppressed, and fuel economy can be improved.

In the first operating range C on the low load, low rotation side in which the injection ratio of the first fuel injection valve 30 is high, for example, the waste gate valve 37 is set in the open state. Thus, the drive load on the turbine 33a of the turbocharger 33 is reduced, and the pumping loss can be decreased. Hence, the output of the engine 10 and fuel economy can be improved.

Concretely, in the present embodiment, the first operating range C (first injection region A) is assigned to MPI injection, with the waste gate valve 37 being in the open state. Consequently, both of the pumping loss due to the intake air cooling effect and the intake pumping loss generated by supercharging can be suppressed. Subsequently, the waste gate valve 37 is changed from the open state to the closed state (closing direction), and then to the open state (opening direction), in conformity with the increase in the injection amount or injection ratio of the second fuel injection valve 31. As a result, the interior of the combustion chamber 17 is cooled by the heat of vaporization of fuel injected from the second fuel injection valve 31 to raise the combustion efficiency, with an excessive rise in the boost pressure by the turbocharger 33 being suppressed. Also, the exhaust resistance is reduced to decrease the pumping loss. Thus, an improvement in fuel economy can be ensured.

If the boost pressure is inhibited from excessively increasing, moreover, air flowing into the combustion chamber 17 can be prevented from becoming excessively turbulent. Thus, fuel injected from the second fuel injection valve 31 can be mixed well with intake air within the combustion chamber 17, with the result that combustion stability can be enhanced, and the occurrence of smoke due to combustion residues of fuel can be suppressed.

The above situation is apt to occur conspicuously when the turbocharger 33 equipped with a turbine small in size relative to the piston displacement of the engine 10 is used.

Generally, the size of the turbine of the turbocharger is set in conformity with the piston displacement of the engine. That is, the nozzle diameter and the size of the turbine commensurate with the amount of the exhaust gas passing through the exhaust port are set. In adopting such a turbocharger, therefore, two problems are posed. One of them is a turbo lag which is a response delay until supercharging is started. The other problem is a delay in the warm-up of the catalyst for ameliorating the exhaust gas after cold starting of the engine. That is, after cold starting of the engine, the catalyst needs to be warmed up for early activation. Even if the timing of fuel injection is retarded for catalyst warm-up in order to increase the amount of heat supplied to the catalyst, however, the heat is absorbed by the turbine of the turbocharger to delay warm-up.

In recent years, an engine adopting a turbocharger equipped with a turbine of small size relative to the piston displacement of the engine has been available for solving the above-mentioned problems. With such an engine, even when rotating at a low speed, the turbine rotates efficiently, and rising of supercharging takes place satisfactorily, so that the turbo lag can be decreased. The use of the turbine of small size for the piston displacement, moreover, can make the heat capacity of the turbine low, and decrease the amount of heat lost to the turbine during catalyst warm-up, thus achieving early activation of the catalyst.

With the engine loaded with such a turbocharger, however, the amount of the exhaust gas passing through the turbine is large relative to the turbine size. Thus, work for discharging the exhaust gas increases compared with the engine 10 having the turbine size set in conformity with the piston displacement of the engine. Not only the efficiency deteriorates, but also the exhaust pressure increases to build up the burned gas remaining in subsequent strokes (i.e., internal EGR). In detail, such an engine increases the intake amount with the progression of supercharging. Thus, supercharging rises at an early stage in comparison with conventional turbo engines, and the amount of the exhaust gas also increases early. Furthermore, there are many regions where the amount of the exhaust gas passing through the turbine becomes excessive compared with the turbine size. In such regions, the turbine speed is over-speed, and the efficiency of the turbine lowers. The lowered turbine efficiency converts the exhaust gas, which cannot enter the turbine, into exhaust resistance, thus increasing internal EGR.

When the turbine is at over-speed, the compressor arranged coaxially with the turbine is also apt to surge, making supercharging unstable. That is, regions where supercharging is unstable because of the surge increase in comparison with the conventional turbo engines. Further, with the increase of supercharging, the pressure of intake air supplied into the cylinder rises. After compression by the piston, the temperature inside the cylinder before ignition is elevated greatly, posing a higher possibility for knocking. In an engine adopting a turbocharger equipped with a turbine of small size relative to the piston displacement, in particular, knocking is apt to occur at a lower speed than in conventional turbo engines, because of an improvement in turbo response. As a result, more regions where the appropriate ignition timing cannot be set are produced.

To solve such problems, it is conceivable to utilize the heat of vaporization generated with the increase in the injection amount of fuel injected from the second fuel injection valve, and lower the temperature inside the cylinder using this heat, thereby avoiding knocking. In this case, however, the injection amount is so large that fuel economy deteriorates, and problems arise, such as the occurrence of smoke and increases in the amount of fuel deposited on the interior of the cylinder.

With the present invention, as described above, in accordance with the increase in the injection amount or injection ratio of the second fuel injection valve 31 associated with the increase in the load or engine speed, the amount of opening of the waste gate valve 37 is adjusted. By so doing, the exhaust pressure or the amount of internal EGR can be decreased to avoid a situation where knocking is likely to occur. That is, the injection amount or injection ratio of the second fuel injection valve 31 is not increased more than the increase in the injection amount or injection ratio of the second fuel injection valve 31 associated with the increase in the load or engine speed. As a result, the situation where knocking is apt to occur can be avoided. Furthermore, the appropriate ignition timing can be set, so that deteriorations in output performance and fuel economy can be inhibited. Such features of the present invention are effective, particularly, in the engine adopting the turbocharger with the small turbine size compared with the piston displacement.

In the operating range D (region B2) where the injection ratio of the second fuel injection valve 31 is high, on the other hand, the engine load or speed is increased. Thus, the waste gate valve 37 is brought to the closed state to enhance the supercharging effect of the turbocharger 33. Accordingly, the amount of air (amount of flow) within the cylinder also increases, and fuel directly injected from the second fuel injection valve 31 into the cylinder is mixed with intake air satisfactorily. Deposition of fuel on the top surface of the piston or the inner wall of the cylinder can also be suppressed, and oil dilution or carbon formation can be inhibited.

Furthermore, the waste gate valve 37 is placed in the open state in the region B3 on the high load, high rotation side, whereby the occurrence of so-called surging can be suppressed. That is, the region B3 is a region where surging occurs. By rendering the waste gate valve 37 open in this region, the occurrence of surging can be suppressed.

Figure 4:
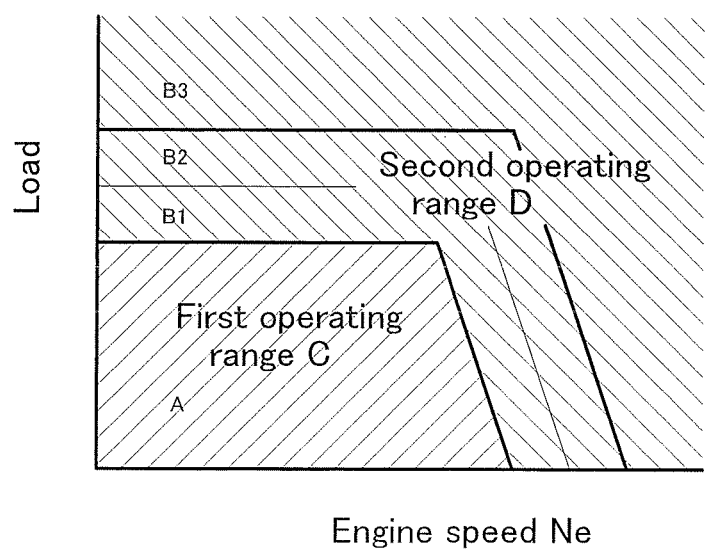
FIG. 4 is a view showing another exemplary map specifying opening/closing control over the waste gate valve according to the embodiment of the present invention.

The present embodiment illustrates the example in which the first injection region A and a part of the second injection region B (e.g., region B1) are included in the first operating range C. As shown in FIG. 4, however, the first operating range C may coincide with the first injection region A, and the second operating range D may coincide with the second injection region B. In other words, fuel may be injected only from the first fuel injection valve 30, in the first operating range C where the waste gate valve 37 is set in the open state. In this case, it is preferred that the waste gate valve 37 be set in the closed state, at a time when the fuel injection control device 52 injects fuel from the second fuel injection valve 31, namely, at a time when the operating state of the engine 10 is switched from the first operating range C to the second operating range D.

By such a procedure, the supercharging effect of the turbocharger 33 in the second operating range D can be rendered higher. In the second operating range D where fuel is injected from the second fuel injection valve 31 into the cylinder, the engine load or speed is increased. This state is suitable for performing supercharging by the turbocharger 33. Hence, the waste gate valve 37 is already set in the closed state at a time when the operating range is switched to the second operating range D. In this manner, the supercharging effect of the turbocharger 33 can be enhanced at an early stage.

Next, an example of control over the opening/closing action of the waste gate valve will be described by reference to a flow chart in FIG. 5.

Figure 5:
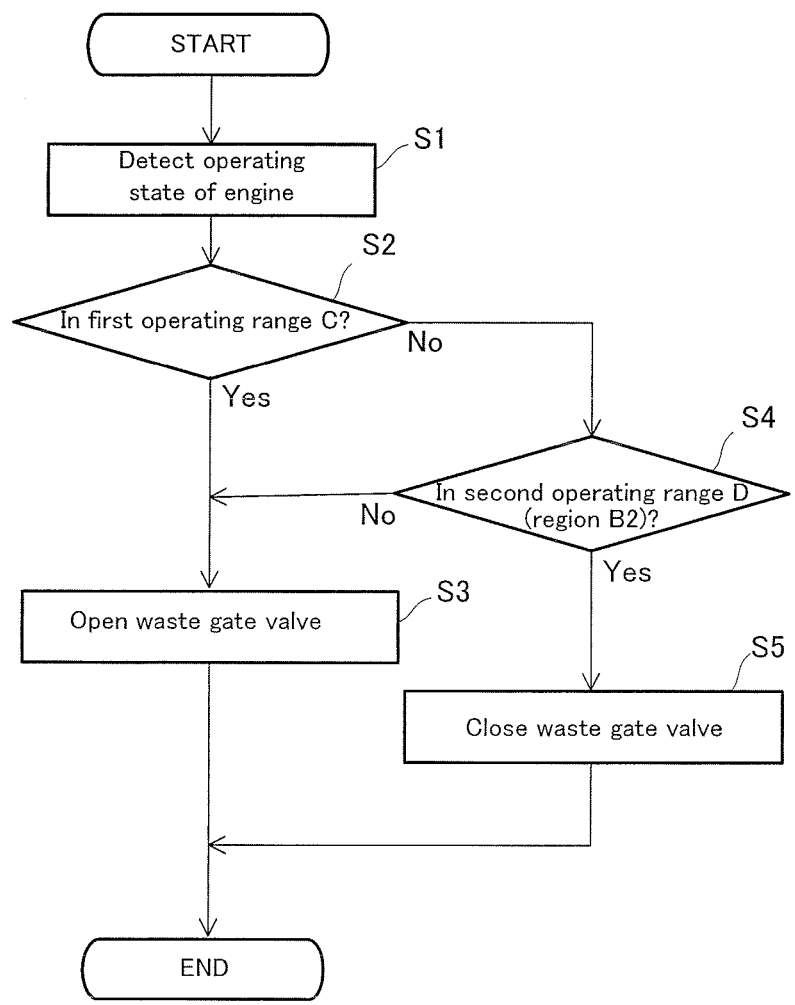
FIG. 5 is a flow chart showing a method of controlling the waste gate valve according to the embodiment of the present invention.

As shown in FIG. 5, the operating state of the engine 10 is detected in Step S1. Concretely, the operating state of the engine 10 is detected, for example, based on information from the various sensors such as a water temperature sensor 43, the throttle position sensor 44 and the crank angle sensor 45 to acquire the speed and load of the engine 10. Then, in Step S2, it is determined whether the operating state of the engine 10 is in the first operating range C. If it is determined here that the operating state of the engine 10 is in the first operating range C (Step S2: Yes), the program proceeds to Step S3, in which the waste gate valve 37 is set in the open state. If it is determined that the operating state of the engine 10 is not in the first operating range C (Step S2: No), on the other hand, the program proceeds to Step S4, in which to determine further whether the operating state of the engine 10 is in the region B2 included in the second operating range D. If it is determined that the operating state of the engine 10 is in the region B2 (Step S4: Yes), the program proceeds to Step S5, in which the waste gate valve 37 is set in the closed state (controlled to act in the closing direction). If it is determined, in Step S4, that the operating state of the engine 10 is not in the region B2, that is, if it is determined that the operating state of the engine 10 is in the region B3 (Step S4: No), the program proceeds to Step S3, in which the waste gate valve 37 is set in the open state (controlled to act in the opening direction).

In the present embodiment, as described above, the opening/closing action of the waste gate valve 37 is controlled, as appropriate, in accordance with the injection amounts or injection ratios of the first fuel injection valve 30 and the second fuel injection valve 31. Concretely, the open/closed state of the waste gate valve 37 is changed in the sequence of the open state, the closed state, and the open state in accordance with the increase in the amount or injection ratio of the second fuel injection valve 31. By so doing, the flow inside the cylinder is optimized, whereby intake air and fuel can be mixed well, and combustion stability can be enhanced. Also, the occurrence of knocking can be suppressed, and fuel economy can be improved.

The present invention has been described as above with reference to the one embodiment, but it goes without saying that the present invention is in no way limited to this embodiment.

For example, in the foregoing embodiment, the valve control device 53 sets the opening of the waste gate valve 37 to be nearly constant within each operating range. However, when the fuel injection control device 52 is to gradually increase the injection amount or injection ratio of the second fuel injection valve 31, with the operating state of the engine 10 being in the region B3 (see FIG. 3), for example, the valve control device 53 may gradually increase the opening of the waste gate valve 37 as the injection amount or injection ratio of the second fuel injection valve 31 increases. Similarly, when the fuel injection control device 52 is to gradually increase the injection amount or injection ratio of the second fuel injection valve 31, with the operating state of the engine 10 being in the region B1 (see FIG. 3), for example, the valve control device 53 may gradually decrease the opening of the waste gate valve 37 as the injection amount or injection ratio of the second fuel injection valve 31 increases. These measures enable an abrupt change in the boost pressure to be suppressed, and the combustion stability of the engine 10 to be improved.

In the above-described embodiment, moreover, only the configuration of the engine has been illustrated, but needless to say, the present invention can be applied, for example, to an engine of a hybrid vehicle equipped with an electric motor.

EXPLANATIONS OF LETTERS OR NUMERALS

10 Engine
11 Engine body
12 Cylinder head
13 Cylinder block
14 Piston
15 Connecting rod
16 Crankshaft
17 Combustion chamber
18 Intake port
19 Intake manifold
20 Intake pipe
21 Intake pressure sensor
22 Intake temperature sensor
23 Intake valve
24 Intake camshaft
24a Intake cam
25 Exhaust port
26 Exhaust manifold
27 Exhaust pipe
28 Exhaust valve
29 Exhaust camshaft
29a Exhaust cam
30 First fuel injection valve
31 Second fuel injection valve
32 Spark plug
33 Turbocharger
33a Turbine
33b Compressor
33c Turbine shaft
34 Intercooler
35 Throttle valve
36 Exhaust bypass passage
37 Waste gate valve
38 Intake bypass passage
39 Intake bypass valve
40 Three-way catalyst
41 O$_2$ sensor
42 Linear air-fuel ratio sensor (LAFS)
43 Water temperature sensor
44 Throttle position sensor
45 Crank angle sensor
50 ECU
51 Operating state detection device
52 Fuel injection control device
53 Valve control device

The invention claimed is:

1. A control apparatus of an engine having
a first fuel injection valve for injecting fuel into an intake path of the engine,
a second fuel injection valve for injecting fuel into a combustion chamber of the engine,
a supercharger for supercharging intake air for the engine, and
a waste gate valve for opening and closing an exhaust bypass passage for bypassing a turbine of the supercharger, the control apparatus comprising:

fuel injection control device that controls injection amounts of fuel injected from the first fuel injection valve and the second fuel injection valve in accordance with an operating state of the engine; and valve control device that changes an open/closed state of the waste gate valve in accordance with the injection amounts of fuel injected from the first fuel injection valve and the second fuel injection valve, wherein the fuel injection control device increases the injection amount of fuel injected from the second fuel injection valve in accordance with an increase in a load or speed of the engine, and the valve control device changes the open/closed state of the waste gate valve in a sequence of an opening direction, a closing direction, and an opening direction as the injection amount of fuel injected from the second fuel injection valve increases.

2. The control apparatus of an engine according to claim 1, wherein the fuel injection control device changes injection ratios of fuel injected from the first fuel injection valve and the second fuel injection valve in accordance with an operating range of the engine, and the valve control device sets the waste gate valve in the open state in a first operating range in which the injection amount of the first fuel injection valve is large.

3. The control apparatus of an engine according to claim 2, wherein the valve control device sets the waste gate valve in the closed state in a second operating range in which the injection amount of the second fuel injection valve is large, and sets the waste gate valve in the open state at a predetermined timing conformed to an increase in the injection ratio or injection amount of the second fuel injection valve in the second operating range.

4. The control apparatus of an engine according to claim 3, wherein the fuel injection control device allows fuel to be injected only from the first fuel injection valve in the first operating range, and the valve control device brings the waste gate valve into the closed state, at a time when the fuel injection control device allows fuel to be injected from the second fuel injection valve.

5. The control apparatus of an engine according to claim 4, wherein the fuel injection control device gradually increases an injection ratio or the injection amount of the second fuel injection valve as the load or speed of the engine increases.

6. The control apparatus of an engine according to claim 3, wherein the fuel injection control device gradually increases an injection ratio or the injection amount of the second fuel injection valve as the load or speed of the engine increases.

7. The control apparatus of an engine according to claim 2, wherein the fuel injection control device allows fuel to be injected only from the first fuel injection valve in the first operating range, and the valve control device brings the waste gate valve into the closed state, at a time when the fuel injection control device allows fuel to be injected from the second fuel injection valve.

8. The control apparatus of an engine according to claim 7, wherein the fuel injection control device gradually increases an injection ratio or the injection amount of the second fuel injection valve as the load or speed of the engine increases.

9. The control apparatus of an engine according to claim 2, wherein the fuel injection control device gradually increases an injection ratio or the injection amount of the second fuel injection valve as the load or speed of the engine increases.

10. The control apparatus of an engine according to claim 1, wherein the fuel injection control device gradually increases an injection ratio or the injection amount of the second fuel injection valve as the load or speed of the engine increases.

* * * * *